United States Patent
Kashima et al.

(10) Patent No.: US 12,471,753 B2
(45) Date of Patent: Nov. 18, 2025

(54) SIGNAL PROCESSING DEVICE, SIGNAL PROCESSING METHOD, PROGRAM, AND MEDICAL IMAGE PROCESSING SYSTEM

(71) Applicant: Sony Group Corporation, Tokyo (JP)

(72) Inventors: Koji Kashima, Tokyo (JP); Takeshi Miyai, Tokyo (JP); Junichiro Enoki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 1004 days.

(21) Appl. No.: 17/437,836

(22) PCT Filed: Mar. 23, 2020

(86) PCT No.: PCT/JP2020/012675
§ 371 (c)(1),
(2) Date: Sep. 10, 2021

(87) PCT Pub. No.: WO2020/196387
PCT Pub. Date: Oct. 1, 2020

(65) Prior Publication Data
US 2022/0151466 A1    May 19, 2022

(30) Foreign Application Priority Data
Mar. 28, 2019    (JP) .................................. 2019-063268

(51) Int. Cl.
*A61B 1/00* (2006.01)
*A61B 1/04* (2006.01)
(Continued)

(52) U.S. Cl.
CPC ........ *A61B 1/000095* (2022.02); *A61B 1/043* (2013.01); *G06T 5/73* (2024.01); *G06T 7/55* (2017.01); *G06T 2207/10028* (2013.01)

(58) Field of Classification Search
CPC ... A61B 1/000095; A61B 1/043; A61B 1/045; G06T 5/73; G06T 7/55;
(Continued)

(56) References Cited

U.S. PATENT DOCUMENTS

| 6,241,656 B1 | 6/2001 | Suga |
| 2003/0122926 A1 | 7/2003 | Kumei |

(Continued)

FOREIGN PATENT DOCUMENTS

| CN | 106134177 A | 11/2016 |
| CN | 107534732 A | 1/2018 |

(Continued)

OTHER PUBLICATIONS

International Search Report and Written Opinion mailed on Jun. 2, 2020, received for PCT Application PCT/JP2020/012675, Filed on Mar. 23, 2020, 8 pages including English Translation.

*Primary Examiner* — Chan S Park
*Assistant Examiner* — Daniel C Chang
(74) *Attorney, Agent, or Firm* — XSENSUS LLP

(57) ABSTRACT

An EDOF signal processing unit performs EDOF signal processing as restoration processing on a special light image acquired by imaging an observation target irradiated with special light, and a setting unit sets a restoration degree of the EDOF signal processing for the EDOF signal processing unit. Then, a parameter for the restoration degree in the EDOF signal processing on the special light image is set so as to make the restoration degree in the EDOF signal processing on the special light image lower than a restoration degree in EDOF signal processing as restoration processing on a normal light image acquired by imaging the observation target irradiated with normal light. The present technology may be applied to, for example, a medical image processing system that performs special light observation.

16 Claims, 10 Drawing Sheets

(51) Int. Cl.
　　　*G06T 5/73*　　　(2024.01)
　　　*G06T 7/55*　　　(2017.01)
(58) Field of Classification Search
　　　CPC ........ G06T 2207/10028; G02B 5/3083; G02B
　　　　　　　23/2453; G02B 23/2461; G02B 23/2484;
　　　　　　　　　　　　　　　　　　　　G02B 27/0075
　　　See application file for complete search history.

(56) References Cited

U.S. PATENT DOCUMENTS

| | | |
|---|---|---|
| 2003/0229270 A1 | 12/2003 | Suzuki |
| 2009/0128668 A1 | 5/2009 | Yoneyama |
| 2014/0055566 A1 | 2/2014 | Hsu |
| 2016/0027156 A1 | 1/2016 | Naruse |
| 2017/0374282 A1* | 12/2017 | Naruse ................. H04N 25/131 |
| 2018/0040108 A1 | 2/2018 | Tanaka |
| 2018/0040109 A1* | 2/2018 | Hayashi ................ G02B 26/007 |
| 2019/0045170 A1 | 2/2019 | Sugie et al. |
| 2020/0345215 A1* | 11/2020 | Springer ............ A61B 1/00193 |
| 2024/0303845 A1* | 9/2024 | Sato ........................ H04N 23/81 |

FOREIGN PATENT DOCUMENTS

| | | |
|---|---|---|
| JP | 2017-158764 A | 9/2017 |
| WO | 2019/044328 A1 | 3/2019 |
| WO | WO-2019048492 A1 | 3/2019 |

\* cited by examiner

SIGNAL PROCESSING DEVICE, SIGNAL PROCESSING METHOD, PROGRAM, AND MEDICAL IMAGE PROCESSING SYSTEM

CROSS-REFERENCE TO RELATED APPLICATIONS

The present application is based on PCT filing PCT/JP2020/012675, filed Mar. 23, 2020, which claims priority to JP 2019-063268, filed Mar. 28, 2019, the entire contents of each are incorporated herein by reference.

TECHNICAL FIELD

The present disclosure relates to a signal processing device, a signal processing method, a program, and a medical image processing system, and especially relates to a signal processing device, a signal processing method, a program, and a medical image processing system capable of performing special light observation with lower noise.

BACKGROUND ART

Conventionally, in a medical observation device such as an endoscope or a microscope, an image having a shallow depth of field is generally acquired. In contrast, since an operative field often has a depth, a medical observation device having a deep depth of field is required.

Therefore, in order to increase the depth of field, an endoscope, a microscope and the like provided with an extended depth of field (EDOF) optical system that extends the depth of field has been proposed.

For example, an image processing device disclosed in Patent Document 1 is provided with an EDOF optical system by a birefringent mask and a control unit using a function for adjusting a blur amount according to a condition, and may observe a subject image in a more preferable mode according to a state, a situation and the like related to observation of the subject image.

CITATION LIST

Patent Document

Patent Document 1: Japanese Patent Application Laid-Open No. 2017-158764

SUMMARY OF THE INVENTION

Problems to be Solved by the Invention

However, conventionally, when special light observation using special light having a wavelength band different from that of normal light is performed using an EDOF optical system, there is a concern that noise increases by performing EDOF signal processing. Therefore, it is required to enable special light observation with lower noise even on an image subjected to the EDOF signal processing.

The present disclosure is achieved in view of such a situation, and an object thereof is to be able to perform special light observation with lower noise.

Solutions to Problems

A signal processing device according to an aspect of the present disclosure is provided with an EDOF signal processing unit that performs extended depth of field (EDOF) signal processing as restoration processing on a special light image acquired by imaging an observation target irradiated with special light, and a setting unit that sets a restoration degree of the EDOF signal processing for the EDOF signal processing unit, in which the setting unit sets a parameter for the restoration degree in the EDOF signal processing on the special light image so as to make the restoration degree in the EDOF signal processing on the special light image lower than a restoration degree in EDOF signal processing as restoration processing on a normal light image acquired by imaging the observation target irradiated with normal light.

A signal processing method or a program according to one aspect of the present disclosure is provided with performing extended depth of field (EDOF) signal processing as restoration processing on a special light image acquired by imaging an observation target irradiated with special light, and setting a restoration degree of the EDOF signal processing, in which a parameter for the restoration degree in the EDOF signal processing on the special light image is set so as to make the restoration degree in the EDOF signal processing on the special light image lower than a restoration degree in EDOF signal processing as restoration processing on a normal light image acquired by imaging the observation target irradiated with normal light.

A medical image processing system according to one aspect of the present disclosure is provided with a light source that irradiates an observation target with special light or normal light, an imaging unit that images the observation target irradiated with the special light or the normal light, an extended depth of field (EDOF) optical system arranged on an optical axis of light incident on the imaging unit, and a signal processing unit that performs signal processing on an image captured by the imaging unit, in which the signal processing unit includes an EDOF signal processing unit that performs EDOF signal processing as restoration processing on a special light image acquired by imaging the observation target irradiated with the special light, and a setting unit that sets a restoration degree of the EDOF signal processing for the EDOF signal processing unit, and the setting unit sets a parameter for the restoration degree in the EDOF signal processing on the special light image so as to make the restoration degree in the EDOF signal processing on the special light image lower than a restoration degree in EDOF signal processing as restoration processing on a normal light image acquired by imaging the observation target irradiated with the normal light.

In one aspect of the present disclosure, a parameter for a restoration degree in EDOF signal processing on special light image is set so as to make the restoration degree in the EDOF signal processing on the special light image lower than a restoration degree in EDOF signal processing as restoration processing on a normal light image acquired by imaging an observation target irradiated with normal light.

MODE FOR CARRYING OUT THE INVENTION

Hereinafter, a specific embodiment to which the present technology is applied is described in detail with reference to the drawings.

Configuration Example of Medical Image Processing System

Figure 1:
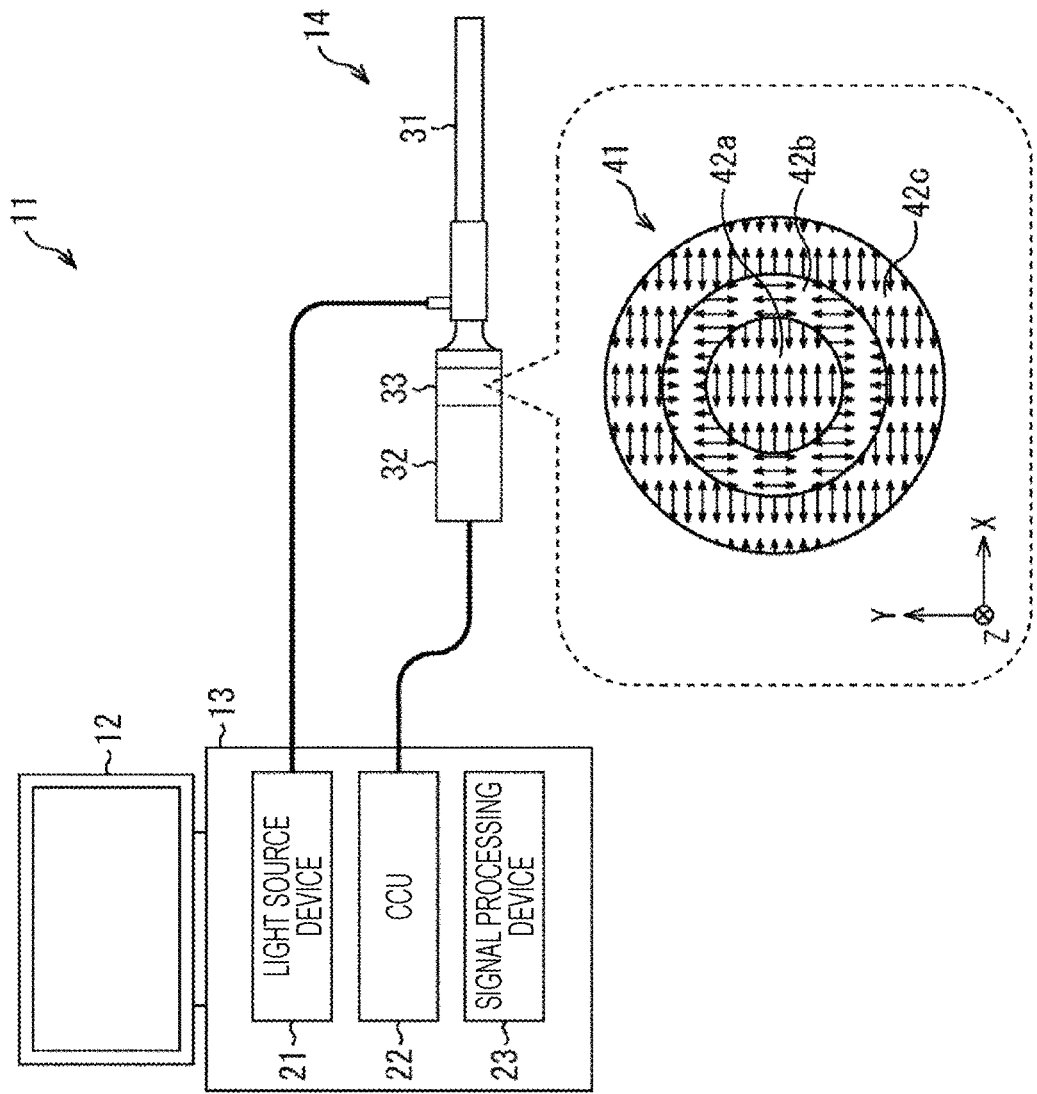
FIG. 1 is a block diagram illustrating a configuration example of one embodiment of a medical image processing system to which the present technology is applied.

FIG. 1 is a block diagram illustrating a configuration example of one embodiment of a medical image processing system to which the present technology is applied.

As illustrated in FIG. 1, a medical image processing system 11 is formed by mounting various devices for endoscopic surgery on a cart 13 on which a display device 12 is placed, and may perform image processing on an image acquired by an endoscope 14 used for the endoscopic surgery, for example.

Figure 10:
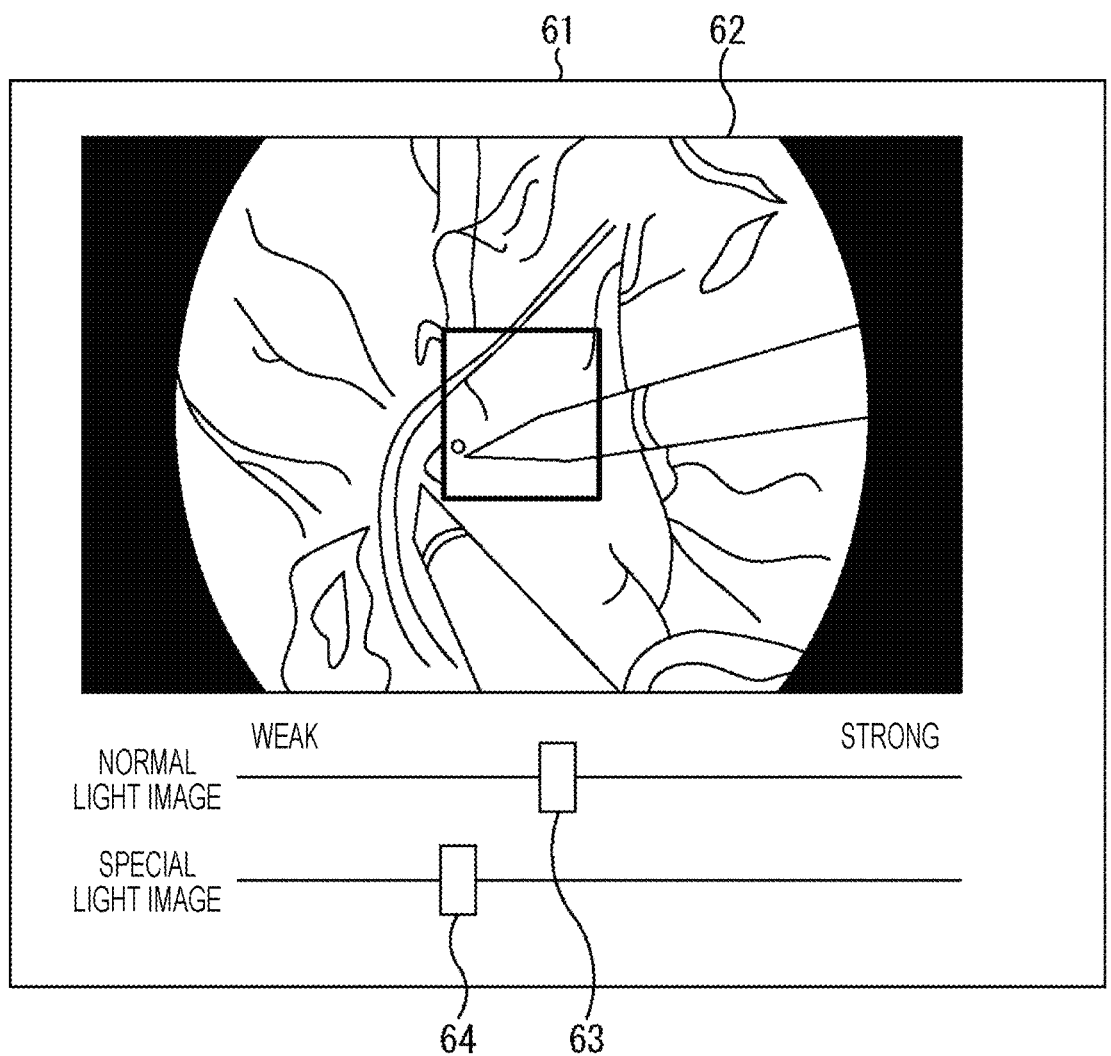
FIG. 10 is a view illustrating an example of a setting screen for setting a restoration degree by the EDOF signal processing.

The display device 12 displays the image acquired by the endoscope 14, an image obtained by applying the image processing to the image and the like. For example, the display device 12 may display a setting screen provided with a user interface as illustrated in FIG. 10 to be described later.

In the example illustrated in FIG. 1, a light source device 21, a camera control unit (CCU) 22, and a signal processing device 23 are mounted on the cart 13.

The light source device 21 is provided with, for example, an LED, a xenon lamp, a halogen lamp, a laser light source, or a light source corresponding to a combination of them, and supplies irradiation light with which an observation target should be irradiated to the endoscope 14 through a light guide. For example, as is described later with reference to FIG. 9, the light source device 21 may apply normal light and special light while switching them at a predetermined timing.

The CCU 22 controls imaging by an imaging element built in a camera head 32, and an image acquired by imaging the observation target by the imaging element is supplied. For example, as is described later with reference to FIG. 9, the CCU 22 may allow the imaging element to image at a predetermined timing.

The signal processing device 23 performs signal processing based on the image acquired by the endoscope 14 and performs the image processing on the image. Note that a detailed configuration of the signal processing device 23 is described later with reference to FIG. 7.

The endoscope 14 includes a lens barrel 31 and the camera head 32, and an optical element insertion unit 33 may be provided between the lens barrel 31 and the camera head 32. Note that, for example, in addition to a structure in which the optical element insertion unit 33 is attachable to and detachable from both the lens barrel 31 and the camera head 32, a structure in which the optical element insertion unit 33 is a part of the lens barrel 31, a structure in which the optical element insertion unit 33 is a part of the camera head 32 and the like may be adopted.

The lens barrel 31 is a scope formed into a tubular shape using a rigid or flexible material, and a portion of a predetermined length from a distal end thereof is inserted into a body cavity of a patient. For example, at the distal end of the lens barrel 31, an opening into which an objective lens is fitted is provided. Furthermore, an introduction unit that introduces light generated by the light source device 21 into the lens barrel 31 is provided on a side surface of the lens barrel 31, and the introduction unit is connected to the light source device 21 by a light guide. Then, the light introduced into the lens barrel 31 is guided to the distal end of the lens barrel 31 by the light guide extended inside the lens barrel 31, and irradiates an observation target in the body cavity of the patient via the objective lens.

The camera head 32 includes the imaging element that captures an image, an optical system for condensing light on the imaging element, an aperture that adjusts a light amount and the like built therein, captures an image under control of the CCU 22, and supplies the image to the CCU 22.

The optical element insertion unit 33 is provided for enabling insertion of an optical element such as a birefringent mask (BM) 41 between the lens barrel 31 and the camera head 32. Note that, in addition to this, there is a cubic phase mask and the like as the optical element that may be inserted by the optical element insertion unit 33.

For example, in the medical image processing system 11, by interposing various optical elements between the lens barrel 31 and the camera head 32 using the optical element insertion unit 33, it is possible to change an optical characteristic of a series of optical systems that form a subject image on the imaging element in the camera head 32 and to adjust a blur amount of the captured image (for example, control a depth of field).

Here, a configuration of the optical element inserted into the optical element insertion unit 33 provided between the lens barrel 31 and the camera head 32 of the endoscope 14 is described.

In recent years, resolution of an imaging element (a so-called image sensor) used in an imaging device such as a camera tends to be higher, and not only "HD (1280×720)" but also "4K UHD (3840×2160)" and "8K UHD (7680×4320)" are proposed. Therefore, also in a medical observation device (imaging device) such as the endoscope 14 according to this embodiment, it is desired to increase resolution of the image to be captured. In contrast, with an increase in resolution, a pixel size of the imaging element tends to be smaller, and an amount of light condensed by each pixel tends to be relatively smaller. Under such a situation, for example, there is a case where an insufficient light amount is compensated by further opening the aperture (that is, by making an f-number smaller), but in contrast, there is a case where the depth of field becomes narrower as the aperture is opened.

In view of the above-described situation, there is a case where a technology of extending the depth of field referred to as EDOF is applied, for example. In the endoscope 14 according to this embodiment, it is possible to further extend the depth of field of the captured image by applying the EDOF technology using a birefringent mask among the EDOF technologies. Specifically, the endoscope 14 according to this embodiment is configured such that the optical element may be inserted by the optical element insertion unit 33 provided between the lens barrel 31 and the camera head 32 as described above, and the depth of field of the captured image is controlled by the insertion of the birefringent mask as the optical element.

For example, FIG. 1 illustrates a configuration in a case where the birefringent mask 41 is seen in an optical axis direction of the camera head 32 as an example of the birefringent mask 41 inserted by the optical element insertion unit 33. Note that, as for the birefringent mask 41 illustrated in FIG. 1, in an area enclosed by broken line in the drawing, a horizontal direction is set to an x direction, a vertical direction is set to a y direction, and a depth direction (that is, the optical axis direction of the camera head 32) is set to a z direction. Furthermore, in the following description, in a case where there is no particular definition, an optical axis direction of the imaging element built in the camera head 32 (in other words, the depth direction) is set to the z direction, and a horizontal direction and a vertical direction of the image captured by the imaging element (that is, directions perpendicular to the optical axis) are set to the x direction and the y direction, respectively.

In the birefringent mask 41, a plurality of polarizing elements 42 is arranged concentrically from the vicinity of the center outward, and in the example illustrated in FIG. 1, three polarizing elements 42a to 42c are arranged. That is, in the birefringent mask 41, the three polarizing elements 42a to 42c are concentrically arranged on an xy plane perpendicular to the optical axis. Note that, in FIG. 1, arrows in the birefringent mask 41 schematically indicate polarization directions of the polarizing elements 42 with the arrows, respectively. That is, the polarizing elements 42a to 42c are provided so that the polarization directions of adjacent elements are different from (substantially orthogonal to) each other.

For example, in the example illustrated in FIG. 1, the polarization direction of the polarizing element 42a is the x direction. In contrast, the polarization direction of the polarizing element 42b adjacent to the polarizing element 42a is the y direction, the direction rotated by 90 degrees with respect to the polarization direction (x direction) of the polarizing element 42a. Similarly, the polarization direction of the polarizing element 42c adjacent to the polarizing element 42b is the x direction, the direction rotated by 90 degrees with respect to the polarization direction (y direction) of the polarizing element 42b.

With such a configuration, light condensed by the lens barrel 31 is incident on any one of the polarizing elements 42a to 42c of the birefringent mask 41 according to a position on the xy plane perpendicular to the optical axis (z direction), and the light polarized by the polarizing elements 42a to 42c is incident on the camera head 32.

Here, a characteristic of the birefringent mask 41 illustrated in FIG. 1 is described with reference to FIG. 2.

Figure 2:
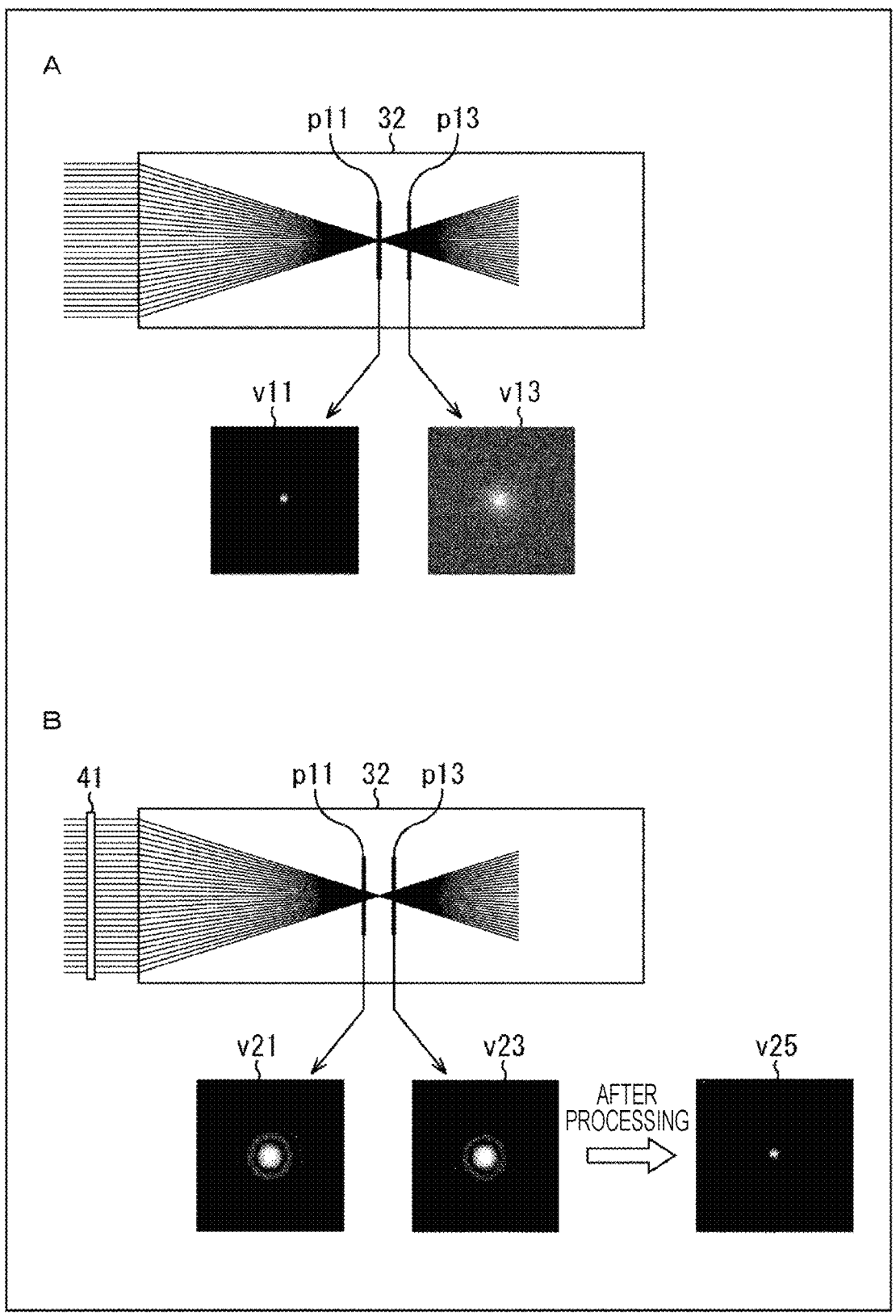
FIG. 2 is a view for explaining a characteristic of a birefringent mask.

FIG. 2 is an explanatory view for explaining the characteristic of the birefringent mask 41 according to this embodiment. Specifically, A of FIG. 2 is an example of a case where the birefringent mask 41 is not interposed between the lens barrel 31 and the camera head 32 in which an optical path of the light condensed by the lens barrel 31 and guided to the camera head 32 is schematically illustrated. Furthermore, B of FIG. 2 is an example of a case where the birefringent mask 41 is interposed between the lens barrel 31 and the camera head 32 in which the optical path of the light condensed by the lens barrel 31 and guided to the camera head 32 via the birefringent mask 41 is schematically illustrated.

As illustrated in A of FIG. 2, the optical path of the light condensed by the lens barrel 31 and guided to the camera head 32 is controlled to form an image on an image surface of the imaging element by an image forming optical system of the camera head 32. In A of FIG. 2, an image represented by reference sign v11 schematically illustrates a subject image formed in a position represented by reference sign p11. Furthermore, an image represented by reference sign v13 schematically illustrates a subject image formed in a position represented by reference sign p13.

In contrast, as illustrated in B of FIG. 2, the light condensed by the lens barrel 31 is guided to the camera head 32 via the birefringent mask 41, and the optical path thereof is controlled by the image forming optical system of the camera head 32. In B of FIG. 2, an image represented by reference sign v21 schematically illustrates a subject image formed in a position represented by reference sign p11. Furthermore, an image represented by reference sign v23 schematically illustrates a subject image formed in a position represented by reference sign p13.

As may be seen by comparing them, the characteristic of a series of optical systems for forming the subject image on the imaging element of the camera head 32 (hereinafter, also simply referred to as "a series of optical systems") changes by the insertion of the birefringent mask 41. Specifically, as the birefringent mask 41 is inserted, a change in image forming shape (that is, a point spread function (PSF)) of the subject image between the positions p11 and p13 becomes smaller than that before the birefringent mask 41 is inserted.

Figure 3:
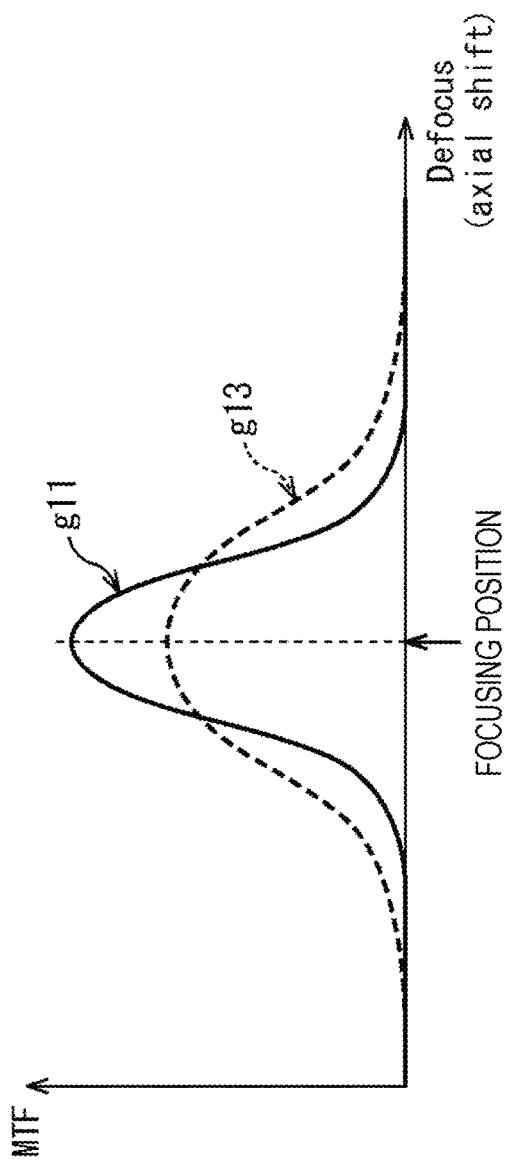
FIG. 3 is a view illustrating an example of a change in modulation transfer function of a series of optical systems accompanying insertion of the birefringent mask.

For example, FIG. 3 is an explanatory view for explaining an example of the characteristic of the birefringent mask 41 applied to the endoscope 14 according to this embodiment in which an example of a change in modulation transfer function (MTF) of a series of optical systems accompanying the insertion of the birefringent mask 41 is illustrated.

In FIG. 3, a shift in the optical axis direction (that is, a defocus amount) with respect to an image forming surface (in other words, a focusing position) of a series of optical systems is plotted along the abscissa, and the modulation transfer function (MTF) is plotted along the ordinate. Furthermore, in FIG. 3, a graph represented by reference sign g11 illustrates an example of the modulation transfer function (MTF) of a series of optical systems in a case where the birefringent mask 41 is not interposed between the lens barrel 31 and the camera head 32 as illustrated in A of FIG. 2. Furthermore, a graph represented by reference sign g13 illustrates an example of the modulation transfer function (MTF) of a series of optical systems in a case where the birefringent mask 41 is inserted between the lens barrel 31 and the camera head 32 as illustrated in B of FIG. 2.

As illustrated in FIG. 3, by applying the birefringent mask 41, the characteristic of a series of optical systems changes in such a manner that the modulation transfer function (MTF) is distributed over a wider range in the optical axis direction than that before the birefringent mask 41 is applied. That is, the depth of field may be further extended by applying the birefringent mask 41.

In contrast, as may be seen with reference to FIG. 3, by applying the birefringent mask 41, a value of the modulation transfer function (MTF) in the focusing position becomes lower than that before the birefringent mask 41 is applied. Therefore, in the medical image processing system 1 according to this embodiment, restoration processing (image processing) is performed on the image captured by the camera head 32 as illustrated in B of FIG. 2, so that the image is restored from image deterioration (so-called blur) of the subject image caused by a decrease in the modulation transfer function (MTF). For example, in B of FIG. 2, an image represented by reference sign v25 illustrates an example of the subject image after the restoration processing in a case where the above-described restoration processing is performed on the subject image v23. Note that there is, for example, processing referred to as deconvolution as the restoration processing (for example, processing of adjusting a blur amount). It goes without saying that the restoration processing applied to the image of the subject image is not necessarily limited to only the deconvolution as long as it is possible to restore from the above-described image deterioration.

By the above-described control, for example, it becomes possible to acquire an image in which the depth of field is extended and the observation target is more clearly presented (that is, a sharper image).

<Study Regarding EDOF Technology Using Birefringent Mask>

A technological problem in a case of applying the EDOF technology using the birefringent mask as in the medical image processing system according to this embodiment is described.

In a case of extending the depth of field by a combination of the birefringent mask and the image processing (restoration processing), a content of processing executed as the image processing is designed on the assumption that optical characteristics of the birefringent mask and other optical systems are known.

Here, in the EDOF technology using the birefringent mask, as described above, for example, the processing referred to as the deconvolution for removing the blur from the image captured via the optical system including the birefringent mask is applied as the above-described image processing. In the deconvolution, by adaptively switching a filter coefficient of the applied filter according to the optical characteristic of the optical system including the birefringent mask, the blur caused by the insertion of the birefringent mask is removed.

Note that there are an inverse filter, a Wiener filter and the like, for example, as a deconvolution filter. The inverse filter corresponds to, for example, a filter designed according to the optical characteristic (for example, the modulation transfer function (MTF) and the like) of the optical system including the birefringent mask (for example, the lens barrel of the endoscope and the like). That is, the inverse filter may be designed to have, for example, an inverse characteristic of the modulation transfer function of the optical system.

Furthermore, a spatial frequency characteristic WF of the Wiener filter is expressed by a calculation formula of formula (1) hereinafter described.

[Mathematical Formula 1]

$$WF(u, v) = \frac{H^*(u, v)}{|H(u, v)|^2 + \frac{S_n(u, v)}{S_f(u, v)}} \quad (1)$$

In formula (1), u and v represent spatial frequencies in x and y directions, respectively, in a case where directions horizontal to an image plane and orthogonal to each other are the x and y directions. Furthermore, H(u,v) represents an optical transfer function (OTF). Note that $H^*(u,v)$ represents a complex conjugate of H(u,v). Furthermore, $S_f(u,v)$ and $S_n(u,v)$ represent power spectra of an original image and noise, respectively.

In contrast, a medical device such as a camera head and a lens barrel (for example, a rigid scope or a flexible scope) of an endoscope used in a medical setting such as surgery is subjected to autoclave (high-pressure steam) sterilization processing each time this is used. Therefore, for example, by repeatedly performing the autoclave sterilization processing on the endoscope, there is a case where an optical characteristic of the optical system (that is, the rigid scope or the flexible scope) of the endoscope, especially the optical characteristic of a birefringent mask gradually changes. Under such circumstances, there is a case where a deviation occurs between the optical characteristic of the birefringent mask (that is, the optical characteristic after change) and the optical characteristic assumed by image signal processing and an image quality of an output image is affected.

Specifically, there is a parameter indicating a phase difference of light referred to as retardation as the optical characteristic of the birefringent mask. The retardation is represented by a product Δnd of a refractive index difference Δn(=ne−no) and a thickness d of a birefringent substance. When so-called autoclave processing (high-pressure steam processing) such as the autoclave sterilization processing is applied to the birefringent mask, it may be estimated that a characteristic of the refractive index difference Δn of the birefringent mask changes (that is, the refractive index difference Δn decreases). As a value of the refractive index difference Δn decreases, for example, an effect regarding extension of the depth of field becomes smaller.

In contrast, when, although the retardation of the birefringent mask changes as described above, the image processing (restoration processing) similar to that before the change in the retardation is applied to the image captured using the birefringent mask, it is highly possible that the image quality of the output image is of so-called excessive emphasis. Therefore, there is a case where it is desirable to enable an output of an image of a more preferable image quality by adaptively switching the content of the image processing according to the change in the retardation of the birefringent mask.

Note that the optical characteristic (retardation) of the birefringent mask may be measured regarding the birefringent mask alone. However, there is a case where the birefringent mask is incorporated as a part of the optical system (for example, the rigid scope) of the endoscope, the optical system of the camera head and the like, and in such a case, it is difficult to measure the optical characteristic of the birefringent mask alone.

Moreover, by applying, by using the image captured by the camera head 32 as an input image, the restoration processing on the basis of PSF information acquired on the basis of a measurement result of the point image distribution function for the input image, it is possible to restore the subject image from the image deterioration (that is, blur). There is, for example, processing referred to as so-called deconvolution as the restoration processing. As a more specific example, by applying image processing (for example, filter processing) based on an inverse characteristic of the acquired PSF information on the input image, it is restored from the image deterioration (blur) that occurs according to the optical characteristic indicated by the PSF information. It goes without saying that the restoration processing performed on the input image is not necessarily limited to only the deconvolution as long as the image deterioration of the subject image may be improved on the basis of the PSF information, and for example, the restoration processing using machine learning and the like may also be adopted.

Here, in the restoration processing by the machine learning, for example, it is possible to restore from the image deterioration by performing the following learning processing. First, learning data in which an image before restoration and an image after restoration are paired is prepared. Next, a parameter for estimating the image after the restoration from the image before the restoration is generated by inputting the learning data to a predetermined learning model to perform learning. Then, the restored image is generated by inputting the image before the restoration to a restored image generation model tuned using this parameter. Note that the learning model and the restored image generation model are preferably calculation models using a multilayer neural network, and more preferably calculation models by a reinforcement learning method using the multilayer neural network.

In medical care, there is an increasing demand for surgery by special light observation, and in a case where an observation target is irradiated with special light having a wavelength band different from that of normal light, an EDOF effect by an EDOF optical system might be different from that when the observation target is irradiated with the normal light.

For example, it is assumed that IR light is mainly used as the special light. Then, since the IR light has a longer wavelength than that of the normal light (visible light, white light), a refraction effect when the IR light passes through the birefringent mask becomes small, and an effect of extending the depth of field is reduced. Therefore, even if the EDOF signal processing (MTF restoration processing) equivalent to that on an image by visible light observation is performed on an image by special light observation, only an effect of increasing noise appears, and the effect of extending the depth of field becomes small.

That is, by performing the EDOF signal processing, originally, the noise of the image might increase or partial instability of the MTF might occur in trade-off with extension of the depth of field. Therefore, in the special light observation using the IR light, not only the increase in noise and the instability of the MTF are emphasized, but also the effect of extending the depth of field is reduced. Furthermore, in the special light observation, a restoration degree is made lower than that with the visible light.

Therefore, the medical image processing system 11 of the present disclosure proposes a technology capable of providing an operative field image with a more appropriate EDOF effect (EDOF signal processing) even in the special light observation. For example, the medical image processing system 11 may reduce the noise by making the EDOF signal processing in the special light observation weaker than that in the normal light observation.

Figure 4:
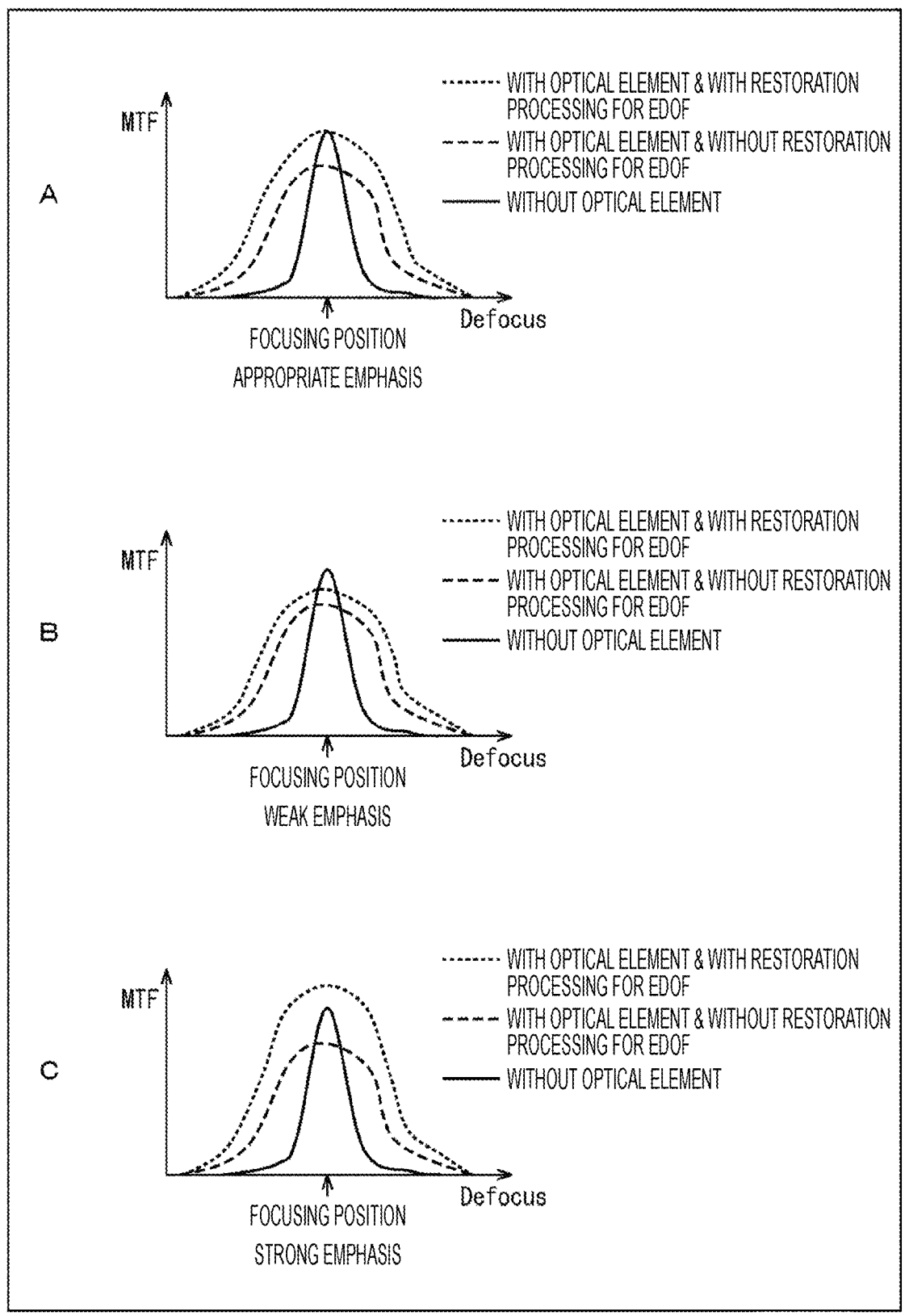
FIG. 4 is a view for explaining a definition of weakening EDOF signal processing.

With reference to FIG. 4, a definition of decreasing the restoration degree by the EDOF signal processing is described.

A of FIG. 4 illustrates a relationship between the modulation transfer function (MTF) and the defocus amount when the restoration degree by the EDOF signal processing is appropriate. For example, it is considered that an emphasis degree such that the modulation transfer function (MTF) in the focusing position matches between a case without the optical element and a case where the optical element is provided and the restoration processing by the EDOF signal processing is performed is appropriate.

B of FIG. 4 illustrates a relationship between the modulation transfer function (MTF) and the defocus amount when the restoration degree by the EDOF signal processing is low. For example, to weaken the emphasis in the EDOF signal processing is to allow the modulation transfer function (MTF) in the focusing position to be smaller when the optical element is provided and the restoration processing by the EDOF signal processing is performed as compared with the case without the optical element.

C of FIG. 4 illustrates a relationship between the modulation transfer function (MTF) and the defocus amount when the restoration degree by the EDOF signal processing is high. For example, to strengthen the emphasis in the EDOF signal processing is to allow the modulation transfer function (MTF) in the focusing position to be larger when the optical element is provided and the restoration processing by the EDOF signal processing is performed as compared with the case without the optical element.

Note that, for example, regarding a filter that corrects the modulation transfer function (MTF) such as the deconvolution filter, it is conceivable to apply various mathematical formulae, and correction may be performed by changing the coefficients thereof. Furthermore, any coefficient may be changed (increased/decreased), and for example, this may be relatively changed with respect to the modulation transfer function (MTF) in the focusing position when the EDOF signal processing is not performed.

Balance between the restoration degree by the EDOF signal processing and the noise generated in the image is described with reference to FIG. 5.

Figure 5:
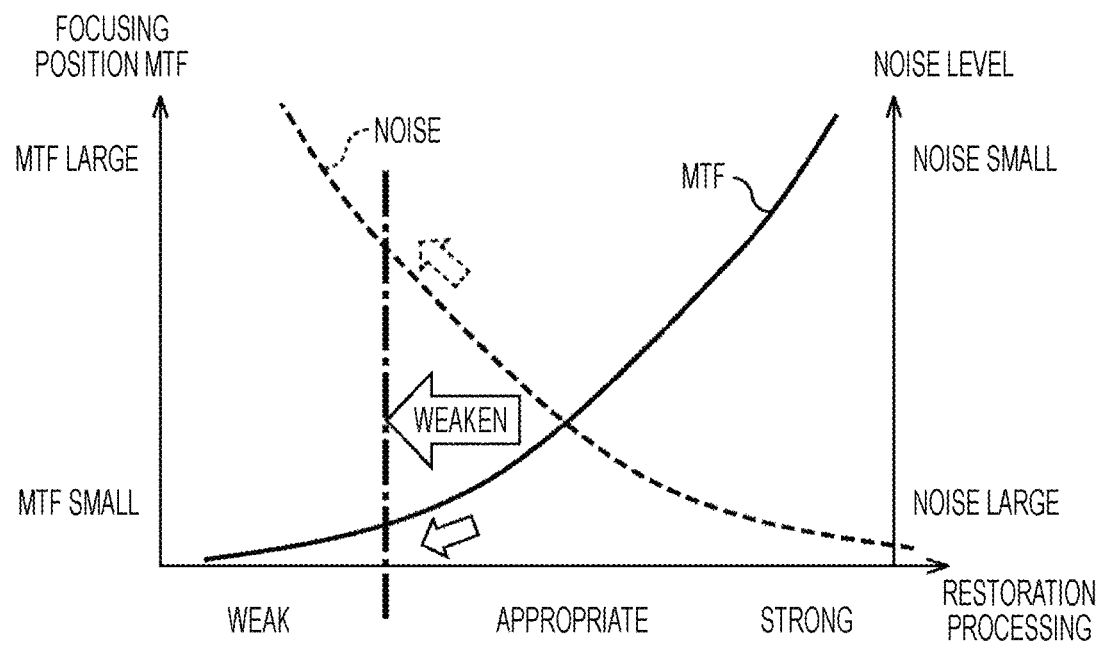
FIG. 5 is a view illustrating a relationship between a degree of an effect by the EDOF signal processing and noise.

In FIG. 5, a degree of the restoration processing is plotted along the abscissa. Assuming that the center of the abscissa (an intersection of an MTF curve and a noise curve) is appropriate, it is indicated that the degree of the restoration processing is lower toward a left side and the degree of the restoration processing is higher toward a right side with respect to an appropriate degree of the restoration processing.

Furthermore, the modulation transfer function (MTF) in the focusing position is plotted along the ordinate on the left side; as indicated by the MTF curve, the modulation transfer function (MTF) in the focusing position increases as the degree of the restoration processing becomes higher, and the modulation transfer function (MTF) in the focusing position decreases as the restoration processing is weakened. In contrast, a noise level is plotted along the ordinate on a right side; as indicated by the noise curve, the noise increases as the degree of the restoration processing becomes higher, and the noise decreases as the degree of the restoration processing becomes lower.

In this manner, there is a trade-off relationship between the modulation transfer function (MTF) in the focusing position and the noise according to the degree of the restoration processing. Therefore, when the degree of the restoration processing is decreased from the appropriate degree, the noise decreases but the modulation transfer function (MTF) in the focusing position also decreases. Therefore, in the trade-off between the EDOF effect and the noise emphasis, magnitude with which the degree of the restoration processing is decreased may be determined with reference to the balance between them.

For example, regarding the magnitude with which the degree of the restoration processing is decreased, a relationship with a decreasing rate of noise may be tabulated in advance in a use case assumed in advance. Then, with reference to the table, the magnitude with which the degree of the restoration processing is decreased may be selected.

Figure 6:
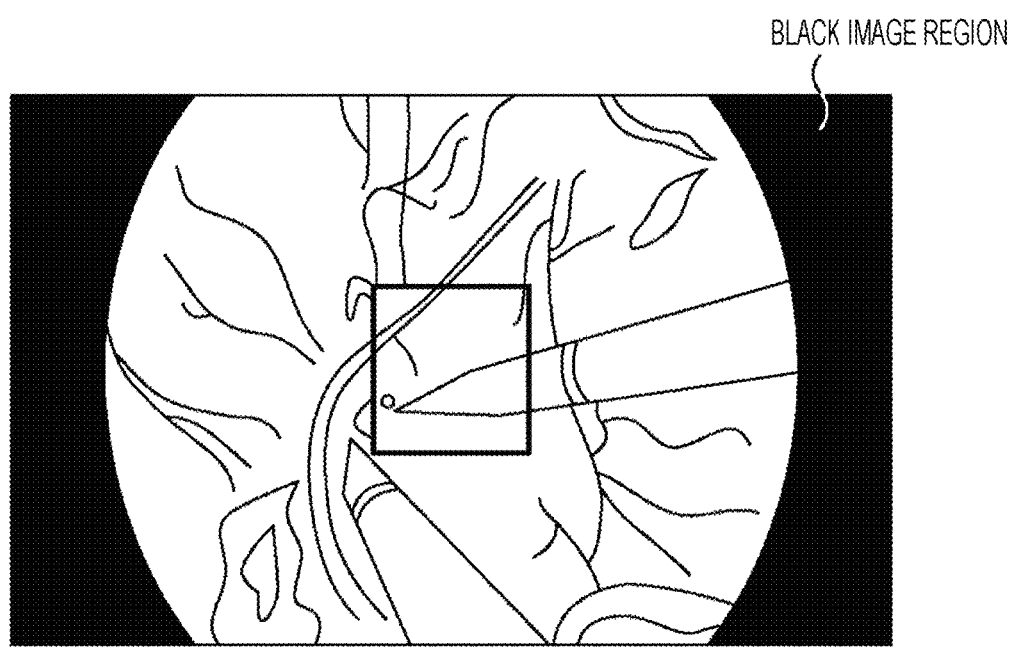
FIG. 6 is a view for explaining a black image region.

Furthermore, for example, it is possible to measure a noise amount from the image acquired by the endoscope 14, and decrease the degree of the restoration processing until a desired noise amount is obtained. For example, as illustrated in FIG. 6, in the image acquired by the endoscope 14, the noise amount may be measured from a luminance change in a black image region (a mask region, a mechanical vignetting region) in which the subject is not imaged.

In addition to this, the medical image processing system 11 may analyze brightness, edge strength, the noise amount and the like from the image being captured and dynamically switch the restoration degree. Furthermore, the magnitude with which the degree of the restoration processing is decreased may be selected from a composite degree for the normal light image to turning off of the EDOF signal processing.

Moreover, in the medical image processing system 11, since a more blurred image is acquired by decreasing the restoration degree, another image processing such as edge emphasis, contrast emphasis, and gamma correction may be applied in combination for the purpose of complementing this. At that time, edge information of the normal light image may be applied to a special light captured image to perform image processing of emphasizing the edge.

Figure 7:
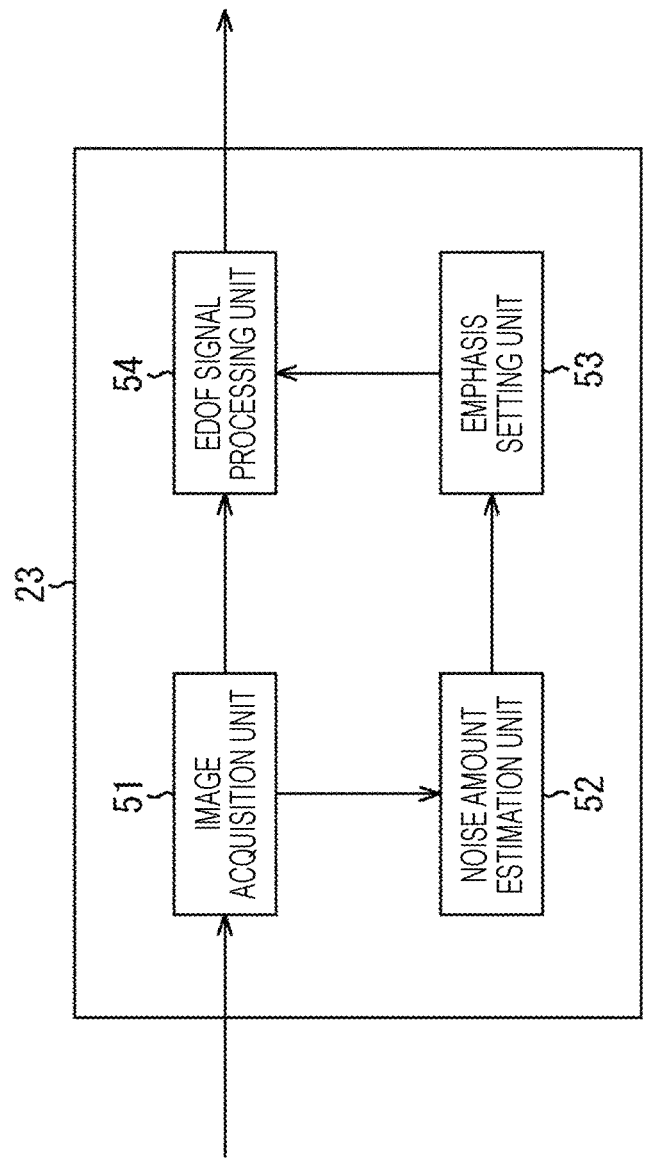
FIG. 7 is a block diagram illustrating a configuration example of a signal processing unit.

FIG. 7 is a block diagram illustrating a configuration example of the signal processing device 23 that realizes the special light observation with lower noise.

As illustrated in FIG. 7, the signal processing device 23 is provided with an image acquisition unit 51, a noise amount estimation unit 52, an emphasis setting unit 53, and an EDOF signal processing unit 54.

The image acquisition unit 51 acquires the normal light image captured by the imaging element of the camera head 32 in a period in which the observation target is irradiated with the normal light by the light source device 21, and acquires a special light image captured by the imaging element of the camera head 32 in a period in which the observation target is irradiated with the special light by the light source device 21.

The noise amount estimation unit 52 estimates the noise amount from the luminance change in the black image region (the mask region, the mechanical vignetting region) in which the subject is not imaged as illustrated in FIG. 6 in the normal light image acquired by the image acquisition unit 51.

The emphasis setting unit 53 sets an emphasis degree in the EDOF signal processing on the special light image for the EDOF signal processing unit 54 according to the noise amount estimated by the noise amount estimation unit 52. For example, a predetermined prescribed value for setting to decrease the emphasis degree is set in advance in the emphasis setting unit 53. Then, the emphasis setting unit 53 sets the EDOF signal processing unit 54 to perform the EDOF signal processing with a low emphasis degree (refer to B of FIG. 4) in a case where the noise amount is equal to or larger than the prescribed value. In contrast, the emphasis setting unit 53 sets the EDOF signal processing unit 54 to perform the EDOF signal processing with an appropriate emphasis degree (refer to A of FIG. 4) in a case where the noise amount is smaller than the prescribed value. For example, the emphasis setting unit 53 may set a parameter for adjusting the emphasis degree in the EDOF signal processing for the EDOF signal processing unit 54.

The EDOF signal processing unit 54 performs the EDOF signal processing on the normal light image and the special light image according to the setting by the emphasis setting unit 53. Then, the normal light image and the special light image subjected to the EDOF signal processing by the EDOF signal processing unit 54 are output from the signal processing device 23 and displayed on the display device 12.

Figure 8:
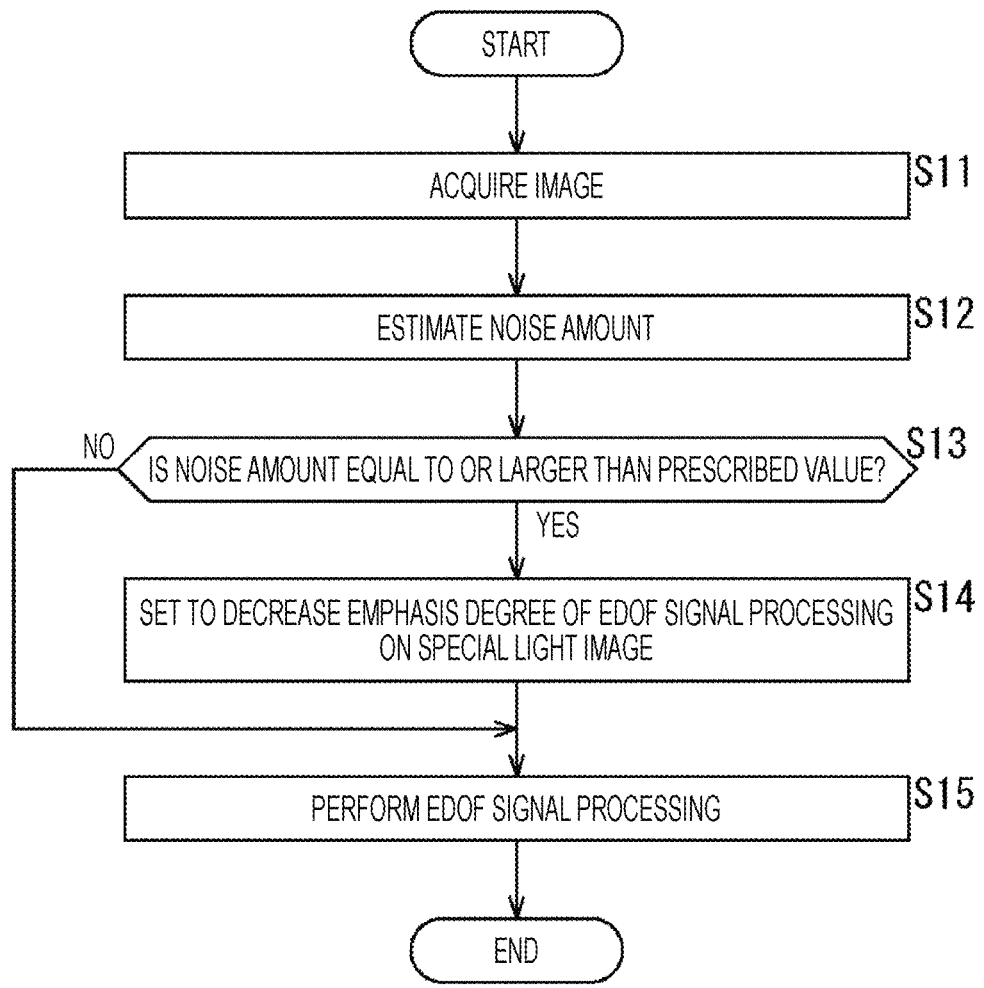
FIG. 8 is a flowchart for explaining signal processing.

The signal processing executed by the signal processing device 23 is described with reference to a flowchart illustrated in FIG. 8.

For example, when the normal light image and the special light image are captured by the imaging element of the camera head 32, the processing is started, and at step S11, the image acquisition unit 51 acquires the normal light image and the special light image supplied from the camera head 32. Then, the image acquisition unit 51 supplies the normal light image to the noise amount estimation unit 52 and supplies the special light image to the EDOF signal processing unit 54.

At step S12, the noise amount estimation unit 52 estimates the noise amount generated in the black image region from the luminance change in the black image region (refer to FIG. 6) of the normal light image supplied from the image acquisition unit 51 at step S11. Then, the noise amount estimation unit 52 supplies the estimated noise amount to the emphasis setting unit 53.

At step S13, the emphasis setting unit 53 determines whether or not the noise amount supplied from the noise amount estimation unit 52 at step S12 is equal to or larger than a predetermined prescribed value set in advance.

At step S13, in a case where the emphasis setting unit 53 determines that the noise amount is equal to or larger than the prescribed value, the procedure shifts to step S14.

At step S14, the emphasis setting unit 53 performs setting on the EDOF signal processing unit 54 so as to decrease the emphasis degree in the EDOF signal processing on the special light image.

After the processing at step S14 or in a case where it is determined at step S13 that the noise amount is not equal to or larger than the prescribed value (smaller than the prescribed value), the procedure shifts to step S15.

At step S15, the EDOF signal processing unit 54 performs the EDOF signal processing on the special light image supplied from the image acquisition unit 51 at step S11. At that time, the EDOF signal processing unit 54 performs the EDOF signal processing with a low emphasis degree (refer to B of FIG. 4) in a case where the noise amount is equal to or larger than the prescribed value, and performs the EDOF signal processing with an appropriate emphasis degree (refer to A of FIG. 4) in a case where the noise amount is smaller than the prescribed value.

Then, after the processing at step S15, the signal processing is finished.

As described above, the signal processing device 23 may decrease the emphasis degree in the EDOF signal processing on the special light image according to the noise estimated from the normal light image. Therefore, the medical image processing system 11 may perform the special light observation with lower noise.

Next, timings at which the normal light image and the special light image are acquired frame sequentially is described with reference to FIG. 9. Note that FIG. 9 illustrates an example in which strong EDOF signal processing is applied to the normal light image and weak special light image is applied to the special light image.

Figure 9:
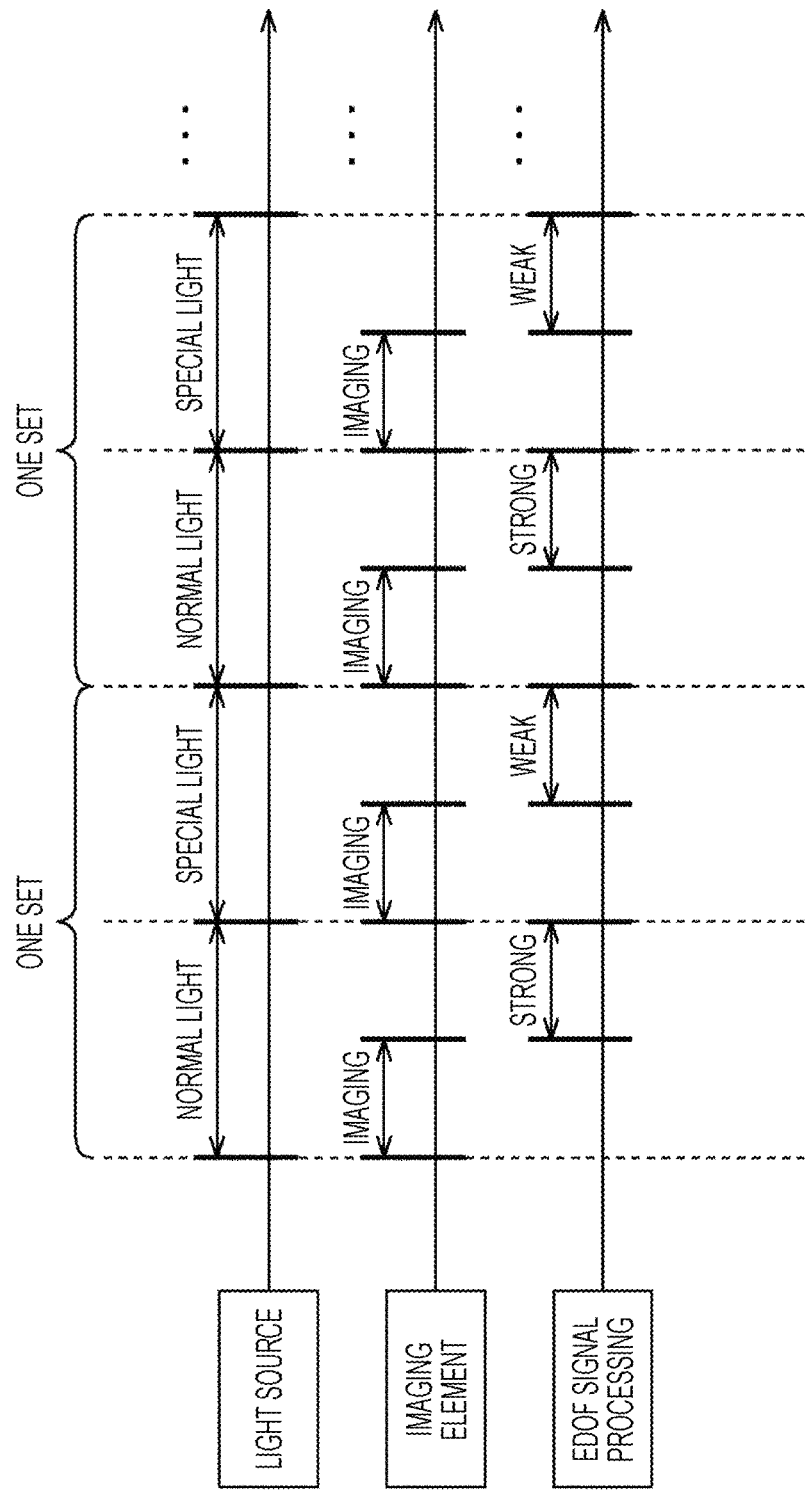
FIG. 9 is a view for explaining time-division imaging.

As illustrated in FIG. 9, for example, a period in which the normal light and the special light are applied once by the light source device 21 is made one set, and this one set is repeatedly performed frame sequentially.

Then, the CCU 22 controls the imaging element of the camera head 32 to perform the imaging in an irradiation period of the normal light to acquire the normal light image, and the EDOF signal processing unit 54 performs strong EDOF signal processing on the normal light image. Thereafter, the CCU 22 controls the imaging element of the camera head 32 to perform the imaging in an irradiation period of the special light to acquire the special light image, and the EDOF signal processing unit 54 performs weak EDOF signal processing on the normal light image.

In this manner, the medical image processing system 11 may make the restoration degree by the EDOF signal processing performed on the special light image lower than that of the normal light image when it is switched to a special light observation mode.

For example, in a configuration in which one imaging element is provided in the camera head 32, it is possible to image in time division (frame sequential) manner in which the normal light image and the normal light image are alternatively acquired. At that time, since the focusing position is shifted because wavelengths of the normal light and special light are different from each other, it is considered to be difficult to continuously focus both on the normal light image and the normal light image. Therefore, in the medical image processing system 11, it is preferable to focus on the normal light image in order to avoid difficulty in a procedure and situation determination in the endoscopic surgery. Accordingly, the special light image is defocused, but since the EDOF effect is limited, it is possible to cope with this by further decreasing the restoration degree by the EDOF signal processing.

Note that, in a configuration in which two imaging elements are provided in the camera head 32, the normal light image and the normal light image may be continuously captured by the respective imaging elements.

FIG. 10 illustrates an example of a setting screen for setting the restoration degree by the EDOF signal processing on the normal light image and the special light image.

As illustrated in FIG. 10, a slide bar serving as the user interface for setting the restoration degree by the EDOF signal processing on the normal light image and the special light image is displayed below a preview image 62 displayed on a setting screen 61.

That is, when a slider 63 of the slide bar of the normal light image is moved leftward, the restoration degree by the EDOF signal processing on the normal light image is set to be lower, and when the slider 63 is moved rightward, the restoration degree by the EDOF signal processing on the normal light image is set to be higher. Similarly, when a slider 64 of the slide bar of the special light image is moved leftward, the restoration degree by the EDOF signal processing on the special light image is set to be lower, and when the slider 64 is moved rightward, the restoration degree by the EDOF signal processing on the special light image is set to be higher.

Furthermore, in a case where the restoration degree of the normal light image is changed, the restoration degree of the special light image may also be automatically changed in conjunction with this. For example, it is preferable that the restoration degree is always lower in the special light image than in the normal light image.

Note that, in addition to the slide bar as illustrated in FIG. 10, the restoration degree by the EDOF signal processing may be selected by operation on a button, and various user interfaces may be adopted. For example, a noise reduction button and a depth of field extension button may be used, and the EDOF signal processing may be weakened when the noise reduction button is pressed and the EDOF signal processing may be strengthened when the depth of field extension button is pressed. At that time, it is preferable to reduce the noise or extend the depth of field while maintaining a relationship that the EDOF signal processing on the special light image is always weaker than the EDOF signal processing on the normal light image.

Moreover, the medical image processing system 11 may be configured to display two special light images side by side, the image before the restoration degree for the special light image is decreased and the image after the restoration degree for the special light image is decreased, and to allow a user to select which is desired.

Configuration Example of Computer

Next, a series of processing (signal processing method) described above may be performed by hardware or by software. In a case where a series of processing is performed by the software, a program forming the software is installed on a general-purpose computer and the like.

Figure 11:
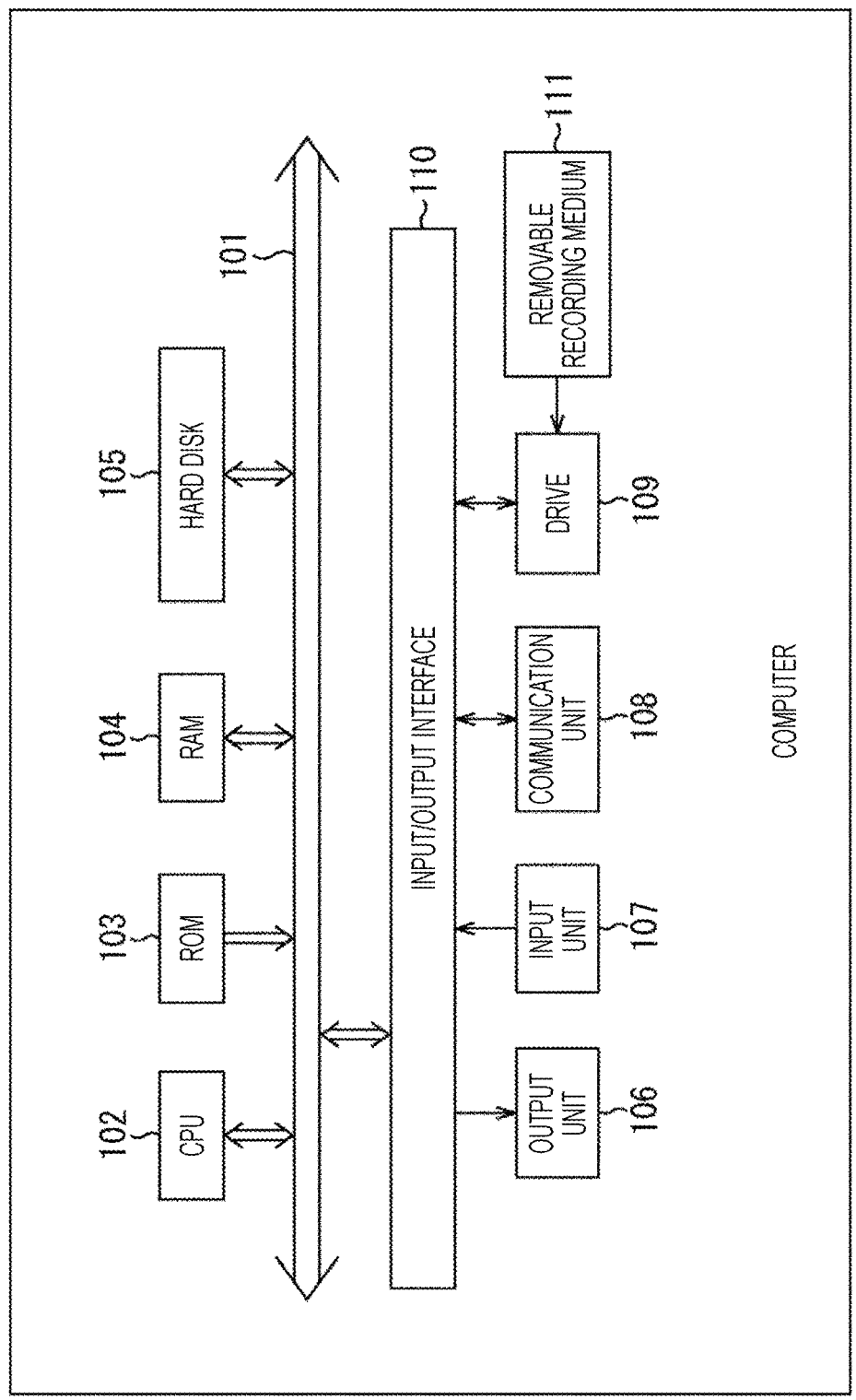
FIG. 11 is a block diagram illustrating a configuration example of one embodiment of a computer to which the present technology is applied.

FIG. 11 is a block diagram illustrating a configuration example of one embodiment of a computer on which a program that executes a series of processing described above is installed.

The program may be recorded in advance in a hard disk 105 and a ROM 103 as a recording medium embedded in the computer.

Alternatively, the program may be stored (recorded) in a removable recording medium 111 driven by a drive 109. Such removable recording medium 111 may be provided as so-called package software. Herein, the removable recording medium 111 includes a flexible disk, a compact disc read only memory (CD-ROM), a magneto optical (MO) disk, a digital versatile disc (DVD), a magnetic disk, a semiconductor memory and the like, for example.

Note that the program may be installed on the computer from the above-described removable recording medium 111 or may be downloaded to the computer through a communication network and a broadcast network to be installed on the embedded hard disk 105. That is to say, the program may be wirelessly transmitted from a downloading site to the computer through a satellite for digital satellite broadcasting or may be transmitted by wire to the computer through the network such as a local area network (LAN) and the Internet, for example.

A central processing unit (CPU) 102 is embedded in the computer and an input/output interface 110 is connected to the CPU 102 through a bus 101.

When an instruction is input by operation and the like of an input unit 107 by a user through the input/output interface 110, the CPU 102 executes the program stored in the read only memory (ROM) 103 in response to this. Alternatively, the CPU 102 loads the program stored in the hard disk 105 on a random access memory (RAM) 104 to execute.

Therefore, the CPU 102 performs the processing according to the above-described flowchart or the processing performed by the configuration of the above-described block diagram. Then, the CPU 102 allows an output unit 106 to output, or allows a communication unit 108 to transmit, and further allows the hard disk 105 to record and the like a processing result as needed through the input/output interface 110, for example.

Note that the input unit 107 includes a keyboard, a mouse, a microphone and the like. Furthermore, the output unit 106 includes a liquid crystal display (LCD), a speaker and the like.

Herein, in this specification, the processing performed by the computer according to the program is not necessarily required to be performed in chronological order along the order described as the flowchart. That is to say, the processing performed by the computer according to the program also includes processing executed in parallel or independently executed processing (for example, parallel processing or processing by an object).

Furthermore, the program may be processed by one computer (processor) or processed in a distributed manner by a plurality of computers. Moreover, the program may be transmitted to a remote computer to be executed.

Moreover, in this specification, the system is intended to mean assembly of a plurality of components (devices, modules (parts) and the like) and it does not matter whether or not all the components are in the same casing. Therefore, a plurality of devices stored in different casings and connected through a network and one device obtained by storing a plurality of modules in one casing are the systems.

Furthermore, for example, it is also possible to divide the configuration described as one device (or processing unit) into a plurality of devices (or processing units). Other way round, it is also possible to put the configurations described above as a plurality of devices (or processing units) together as one device (or processing unit). Furthermore, it goes without saying that it is possible to add a configuration other than the above-described one to the configuration of each device (or each processing unit). Moreover, it is also possible that a part of the configuration of a certain device (or processing unit) is included in the configuration of another device (or another processing unit) as long as a configuration and operation as an entire system are substantially the same.

Furthermore, for example, the present technology may be configured as cloud computing in which one function is shared by a plurality of devices through a network for processing in cooperation.

Furthermore, for example, the above-described program may be executed by an arbitrary device. In that case, it is only required that the device has necessary functions (functional blocks and the like) so that necessary information may be obtained.

Furthermore, for example, each step described in the above-described flowchart may be executed by one device or executed by a plurality of devices in a shared manner. Moreover, in a case where a plurality of processes is included in one step, a plurality of processes included in one step may be executed by one device or by a plurality of devices in a shared manner. In other words, a plurality of processes included in one step may be executed as processes of a plurality of steps. Conversely, the processes described as a plurality of steps may be collectively executed as one step.

Note that the program executed by the computer may be such that processes at steps of describing the program are executed in chronological order in the order described in this specification or that the processes are executed in parallel or individually executed at required timing such as when a call is issued. That is, as long as there is no inconsistency, the processes at respective steps may be executed in order different from the order described above. Moreover, the process at the step of describing the program may be executed in parallel with the process of another program, or may be executed in combination with the process of another program.

Note that, as long as there is no inconsistency, each of a plurality of technologies described in this specification may be independently implemented as a single unit. It goes without saying that it is also possible to implement by combining a plurality of arbitrary present technologies. For example, a part of or the entire present technology described in any of the embodiments may be implemented in combination with a part of or the entire present technology described in other embodiments. Furthermore, an arbitrary part of or the entire present technology described above may be implemented in combination with other technologies not described above.

Configuration Combination Example

Note that the present technology may also have following configurations.

(1)

A signal processing device provided with:

an EDOF signal processing unit that performs extended depth of field (EDOF) signal processing as restoration processing on a special light image acquired by imaging an observation target irradiated with special light; and a setting unit that sets a restoration degree of the EDOF signal processing for the EDOF signal processing unit, in which the setting unit sets a parameter for the restoration degree in the EDOF signal processing on the special light image so as to make the restoration degree in the EDOF signal processing on the special light image lower than a restoration degree in EDOF signal processing as restoration processing on a normal light image acquired by imaging the observation target irradiated with normal light.

(2)

The signal processing device according to (1) described above, in which the setting unit sets the parameter for the restoration degree so as to decrease the restoration degree for the special light image in a case where a noise amount is equal to or larger than a predetermined prescribed value on the basis of the noise amount estimated from the normal light image.

(3)

The signal processing device according to (1) or (2) described above, in which the special light image and the normal light image are captured frame sequentially.

(4)

The signal processing device according to any one of (1) to (3) described above, in which in a case where the restoration degree for the normal light image is changed using a predetermined user interface, the setting unit sets a parameter for the restoration degree for the normal light image so that the restoration degree for the special light image is always lower in conjunction with the change.

(5)

A signal processing method provided with:

performing extended depth of field (EDOF) signal processing as restoration processing on a special light image acquired by imaging an observation target irradiated with special light; and setting a restoration degree of the EDOF signal processing by a signal processing device, in which a parameter for the restoration degree in the EDOF signal processing on the special light image is set so as to make the restoration degree in the EDOF signal processing on the special light image lower than a restoration degree in EDOF signal processing as restoration processing on a normal light image acquired by imaging the observation target irradiated with normal light.

(6)

A program that allows a computer of a signal processing device to execute processing of:

performing extended depth of field (EDOF) signal processing as restoration processing on a special light image acquired by imaging an observation target irradiated with special light; and setting a restoration degree of the EDOF signal processing, in which a parameter for the restoration degree in the EDOF signal processing on the special light image is set so as to make the restoration degree in the EDOF signal processing on the special light image lower than a restoration degree in EDOF signal processing as restoration processing on a normal light image acquired by imaging the observation target irradiated with normal light.

(7)

A medical image processing system provided with:

a light source that irradiates an observation target with special light or normal light;

an imaging unit that images the observation target irradiated with the special light or the normal light;

an extended depth of field (EDOF) optical system arranged on an optical axis of light incident on the imaging unit; and a signal processing unit that performs signal processing on an image captured by the imaging unit, in which the signal processing unit includes:

an EDOF signal processing unit that performs EDOF signal processing as restoration processing on a special light image acquired by imaging the observation target irradiated with the special light; and a setting unit that sets a restoration degree of the EDOF signal processing for the EDOF signal processing unit, and the setting unit sets a parameter for the restoration degree in the EDOF signal processing on the special light image so as to make the restoration degree in the EDOF signal processing on the special light image lower than a restoration degree in EDOF signal processing as restoration processing on a normal light image acquired by imaging the observation target irradiated with the normal light.

Note that, this embodiment is not limited to the above-described embodiment and may be variously changed without departing from the gist of the present disclosure. Furthermore, the effects described in this specification are illustrative only and are not limitative; there may also be another effect.

REFERENCE SIGNS LIST

11 Medical image processing system
12 Display device
13 Cart
14 Endoscope
21 Light source device
22 CCU
23 Signal processing device
31 Lens barrel
32 Camera head
33 Optical element insertion unit
41 Birefringent mask
42a to 42c Polarizing element
51 Image acquisition unit
52 Noise amount estimation unit
53 Emphasis setting unit
54 EDOF signal processing unit

The invention claimed is:

1. A signal processing device comprising:
circuitry configured to:
extended depth of field (EDOF) signal processing as restoration processing on a special light image acquired by imaging an observation target irradiated with special light;
set a restoration degree of the EDOF signal processing including setting a special light restoration degree in the EDOF signal processing on the special light image acquired by imaging the observation target is irradiated with the special light to be lower than a normal light restoration degree in EDOF signal processing on a normal light image acquired by imaging the observation target irradiated with normal light; and
decrease the special light restoration degree in a case where a noise amount is equal to or larger than a predetermined prescribed value on a basis of the noise amount estimated from the normal light image.

2. The signal processing device according to claim 1, wherein
the special light image and the normal light image are captured frame sequentially.

3. The signal processing device according to claim 1, wherein
in a case where the normal light restoration degree for the normal light image is changed using a predetermined user interface, the circuitry is configured to set the special light restoration degree to in conjunction with the change.

4. A signal processing method comprising:
performing extended depth of field (EDOF) signal processing as restoration processing on a special light image acquired by imaging an observation target irradiated with special light;
setting a restoration degree of the EDOF signal processing by a signal processing device;
estimating a noise amount from the normal light image;
comparing the noise amount to a predetermined prescribed value;
in response to the noise amount being equal to or larger than the predetermined prescribed value, decreasing the special light restoration degree; and
in response to the noise amount being less than the predetermined prescribed value, maintaining the special light restoration degree, wherein
a special light restoration degree in the EDOF signal processing on the special light image acquired by imaging the observation target irradiated with the special light is lower than a normal light restoration degree in EDOF signal processing on a normal light image acquired by imaging the observation target irradiated with normal light.

5. A non-transitory computer readable storage device that stores a program that, when executed by a computer of a signal processing device, causes the computer to execute processing of:
performing extended depth of field (EDOF) signal processing as restoration processing on a special light image acquired by imaging an observation target irradiated with special light;
setting a restoration degree of the EDOF signal processing;
estimating a noise amount from the normal light image;
comparing the noise amount to a predetermined prescribed value;

in response to the noise amount being equal to or larger than the predetermined prescribed value, decreasing the special light restoration degree; and in response to the noise amount being less than the predetermined prescribed value, maintaining the special light restoration degree, wherein a special light restoration degree in the EDOF signal processing on the special light image acquired by imaging the observation target irradiated with the special light is lower than a normal light restoration degree in EDOF signal processing on a normal light image acquired by imaging the observation target irradiated with normal light.

6. A medical image processing system comprising:

a light source that irradiates an observation target with special light or normal light;

an image sensor configured to detect the observation target irradiated with the special light or the normal light;

an extended depth of field (EDOF) optical system arranged on an optical axis of light incident on the image sensor; and a signal processor configured to perform signal processing on an image captured by the image sensor, wherein the signal processor includes:

circuitry configured to:

extended depth of field (EDOF) signal processing as restoration processing on a special light image acquired by imaging an observation target irradiated with special light;

set a special light restoration degree of the EDOF signal processing including setting a parameter for the restoration degree in the EDOF signal processing on the special light image acquired by imaging the observation target is irradiated with the special light to be lower than a restoration degree in EDOF signal processing on a normal light image acquired by imaging the observation target irradiated with normal light; and decrease the special light restoration degree in a case where a noise amount is equal to or larger than a predetermined prescribed value on a basis of the noise amount estimated from the normal light image.

7. The medical image processing system according to claim 6, wherein the special light image and the normal light image are captured frame sequentially.

8. The medical image processing system according to claim 6, wherein in a case where the normal light restoration degree is changed using a predetermined user interface, the circuitry is configured to set the special light restoration degree for the special light image in conjunction with the change.

9. The medical image processing system according to claim 8, wherein the circuitry is configured to set the special light restoration degree to always be lower than the normal light restoration degree.

10. The non-transitory computer readable storage device according to claim 5, wherein the special light image and the normal light image are captured frame sequentially.

11. The non-transitory computer readable storage device according to claim 5, wherein in a case where the normal light restoration degree is changed using a predetermined user interface, the computer is configured to set the special light restoration degree in conjunction with the change.

12. The non-transitory computer readable storage device according to claim 11, wherein the circuitry is configured to set the special light restoration degree to always be lower than the normal light restoration degree.

13. The signal processing method according to claim 4, wherein the special light image and the normal light image are captured frame sequentially.

14. The signal processing method according to claim 4, further comprising:

determining whether the normal light restoration degree is decreased using a predetermined user interface, in response to the normal light restoration degree being decreased using the predetermined user interface, setting the special light restoration degree to always be lower than the normal light restoration degree in conjunction with the change, and otherwise maintaining the special light restoration degree.

15. The signal processing method according to claim 4, wherein setting the special light restoration degree includes setting the special light restoration degree to always be lower than the normal light restoration degree.

16. The signal processing device according to claim 3, wherein the circuitry is configured to set the special light restoration degree to always be lower than the normal light restoration degree.

* * * * *